United States Patent [19]

Jansch

[11] Patent Number: 4,876,884
[45] Date of Patent: Oct. 31, 1989

[54] APPARATUS FOR TESTING THE GAS-TIGHTNESS OF JOINTS BETWEEN HOLLOW BODIES

[75] Inventor: Manfred Jansch, Garbsen, Fed. Rep. of Germany

[73] Assignee: Weatherford Oil Tool GmbH, Hanover, Fed. Rep. of Germany

[21] Appl. No.: 139,013

[22] Filed: Dec. 29, 1987

[30] Foreign Application Priority Data

Jan. 8, 1987 [DE] Fed. Rep. of Germany ....... 3700384

[51] Int. Cl.$^4$ ............................................. G01M 3/28
[52] U.S. Cl. ........................................ 73/49.1; 138/93; 73/46
[58] Field of Search ...................... 73/49.1, 49.5, 49.8, 73/46, 40.7, 40.5 R; 138/93, 98

[56] References Cited

U.S. PATENT DOCUMENTS

| | | | |
|---|---|---|---|
| 2,241,526 | 5/1941 | Rosenkranz | 138/90 |
| 2,416,441 | 2/1945 | Grant et al. | 73/49.5 |
| 2,481,013 | 9/1949 | Henderson | 138/90 |
| 2,807,955 | 10/1957 | Loomis | 73/40.5 R |
| 2,841,007 | 7/1958 | Loomis | 73/40.5 R |
| 3,038,542 | 5/1962 | Loomis | 166/204 |
| 3,154,940 | 11/1964 | Loomis | 73/40.5 R |
| 3,158,378 | 11/1964 | Loomis | 277/198 |
| 3,165,918 | 1/1965 | Loomis | 73/40.5 R |
| 3,193,917 | 7/1965 | Loomis | 29/407 |
| 3,195,645 | 7/1965 | Loomis | 166/201 |
| 3,375,703 | 4/1968 | Phillips | 73/40.5 R |
| 3,439,740 | 4/1969 | Conover | 166/250 |
| 3,478,577 | 11/1969 | Hauk | 73/40.5 R |
| 3,498,518 | 3/1970 | Wheeler et al. | 228/50 |
| 3,685,544 | 8/1972 | Ball | 138/90 |
| 3,800,596 | 4/1974 | Phillips | 73/40.5 R |
| 3,834,421 | 9/1974 | Daley | 138/93 |
| 3,842,659 | 10/1974 | Bacroix | 73/40.7 |
| 3,899,920 | 8/1975 | Martherne | 73/40.5 R |
| 3,949,596 | 4/1976 | Hawk | 73/40.7 |
| 4,061,015 | 12/1977 | Fish | 73/49.5 |
| 4,081,990 | 4/1978 | Chatagnier | 73/40.5 R |
| 4,083,230 | 4/1978 | Rome, Sr. et al. | 73/40.5 R |
| 4,149,566 | 4/1979 | Stowe | 73/49.8 |
| 4,152,924 | 5/1979 | Mayo | 73/40.5 R |
| 4,272,985 | 6/1981 | Rapson, Jr. et al. | 73/49.2 |
| 4,429,566 | 2/1984 | Armell et al. | 73/40.7 |
| 4,646,787 | 3/1978 | Rush et al. | 138/93 |
| 4,691,728 | 9/1987 | Mathison | 138/93 |

FOREIGN PATENT DOCUMENTS 1199919 7/1970 United Kingdom .
1207090 9/1970 United Kingdom .
2063487 6/1981 United Kingdom .

*Primary Examiner*—Hezron E. Williams
*Attorney, Agent, or Firm*—Guy McClung

[57] ABSTRACT

This invention relates to an apparatus for testing the gas-tightness of joints between hollow bodies, for example, pipes. With the apparatus, a test space with two concentric chambers of variable sizes is formed. The outer one is filled with a gaseous test medium and the inner one with an incompressible pressurized medium. It is thereby possible to reduce substantially the quantity of the gaseous test medium. The safety of the entire apparatus is improved extraordinarily.

6 Claims, 9 Drawing Sheets

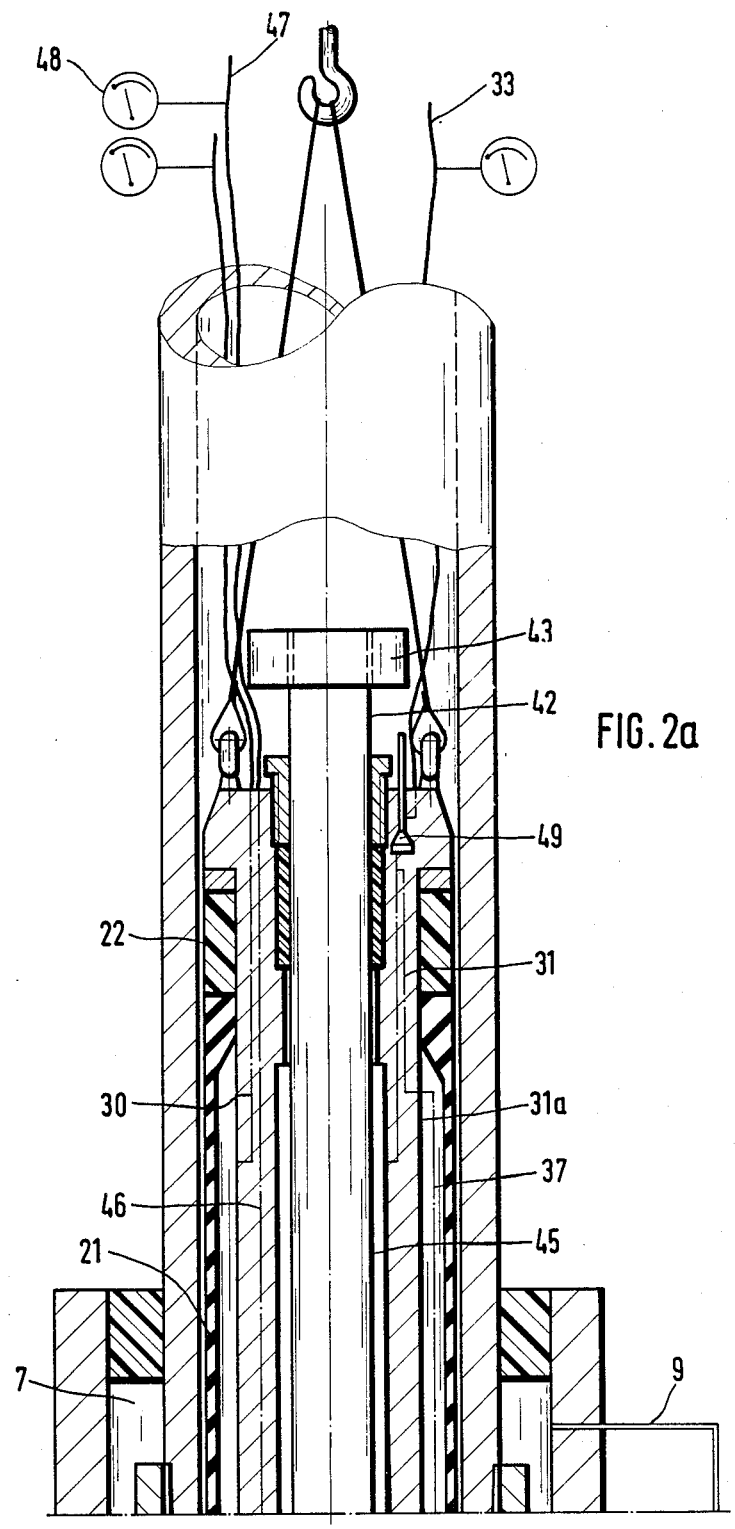

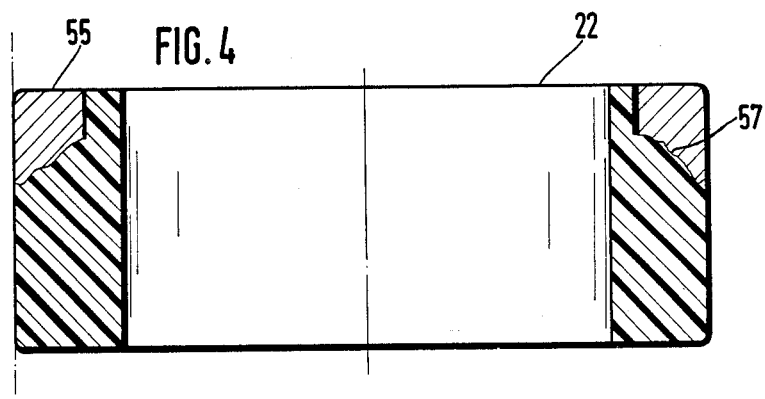
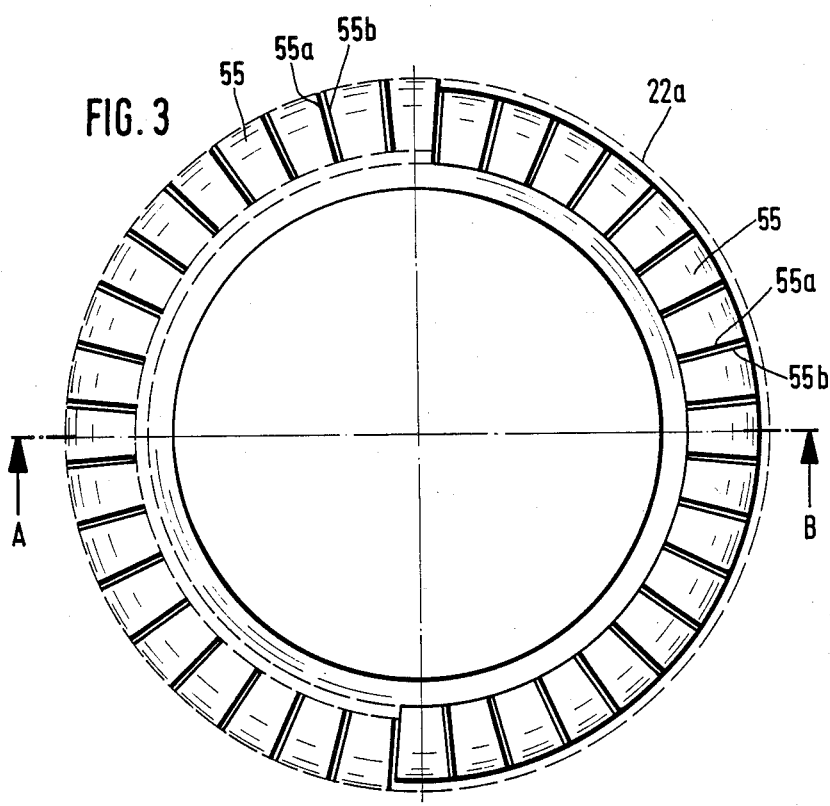

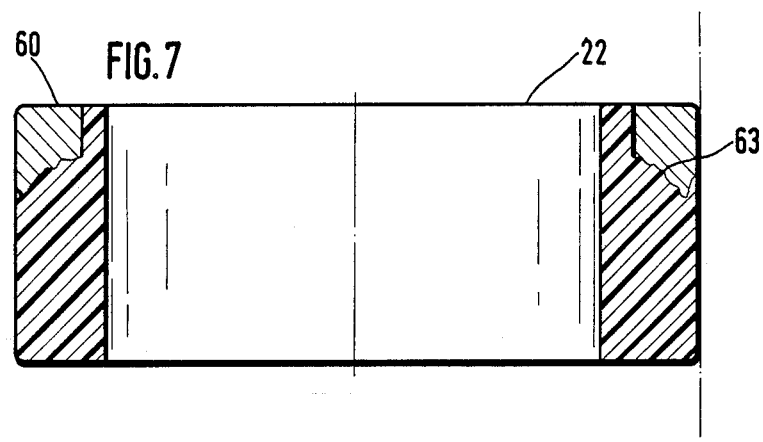
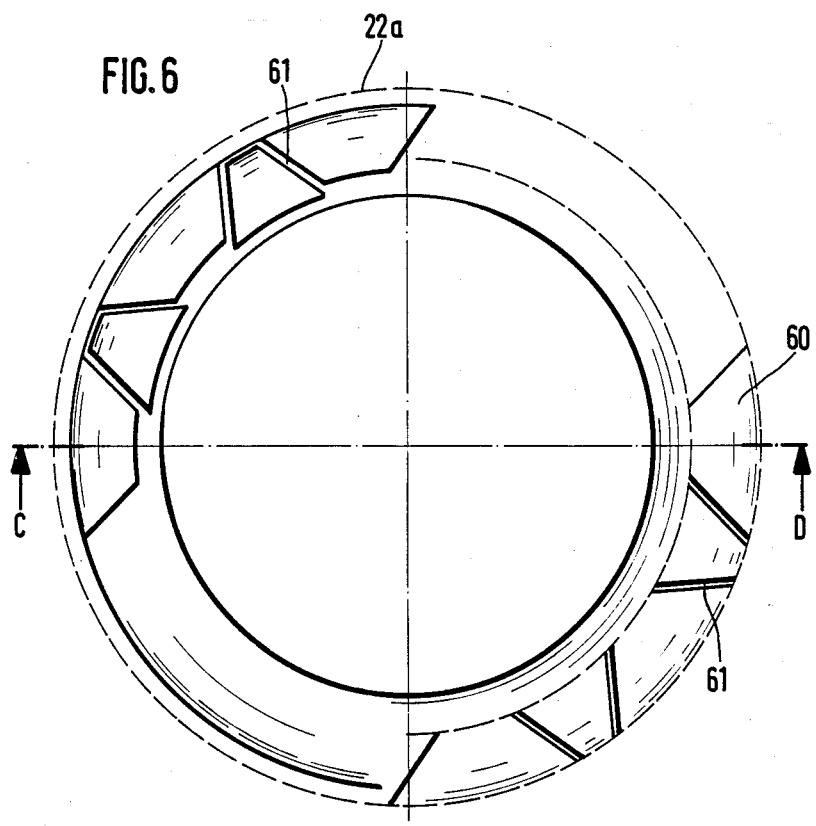

APPARATUS FOR TESTING THE GAS-TIGHTNESS OF JOINTS BETWEEN HOLLOW BODIES

This invention relates to an apparatus for testing the gas-tightness of joints between hollow bodies.

In order to eliminate leaks in joints between hollow bodies, for example between two pipes, it is customary to subject the joints to a leakage test.

In one first procedure, the inside of the pipes is pressurized with liquid and the pressure is checked over a period of time. A pressure drop indicates a leak.

In another test procedure, a gas is passed through two mutually connected pipe sections. In this case the gas pressure is exerted from the inside by means of a shut-off tool. Such a method and a tool for performing the method are described in German Offenlegungsschrift 3,030,665. It shows two annular seal elements made of resiliently yielding material, which are spaced apart and which are compressible axially by two pistons, each of which is associated with one of the seal elements. This causes the seal elements to be applied radially to the interior pipe walls of the mutually connected pipe sections and thus to form a test chamber, into which pressurized test gas, for example helium, is introduced. Measuring instruments are connected to the outside of this test chamber in the region of the test stations, by means of which any escaping quantities of gas are indicated. The known constructions have the disadvantage that they necessitate substantial quantities of test medium (helium) for the test process. With the known apparatus, the gaseous test medium has to be produced and compressed in large quantities. However, large quantities of gas in conjunction with high pressures create substantial dangers, not only in the region of the test apparatus itself, but also at the compressor and in the supply pipe leading from the compressor to the test apparatus.

SUMMARY OF THE INVENTION

The underlying object of at least preferred embodiments of the invention is to construct an apparatus in such a way that the quantity of the gaseous test medium required can be reduced substantially, so that the dangers resulting from the test pressures can be mitigated quite considerably. In order to achieve this object, it is proposed to subdivide the test space formed at the test station into two concentric chambers of variable size, the outer of which can be filled with a gaseous test medium and the inner with an incompressible pressurized medium.

The use of very small quantities of gaseous test medium greatly improves safety It is also possible, in preferred embodiments, to increase the value of the test pressure considerably, that is to say far above 1000 bar, because the great increase in pressure can be generated within the test apparatus and safety is therefore also improved in the region of the separate compressor and of its leads to the test apparatus. Due to the fact that the preferred apparatus can be operated with substantially smaller compressors, a further or additional improvement in safety is obtained, and it is associated with an economic advantage due to the low usage of leak detection gas, for example helium, or of mixtures of helium with other gases.

BRIEF DESCRIPTION OF THE DRAWINGS

For a better understanding of the invention reference will now be made, by way of example, to the accompanying drawings, in which:

FIGS. 2a and 2b together show a larger scale view of the test apparatus shown in FIG. 2;

FIG. 3 is a plan view of a seal element on a further enlarged scale;

FIG. 4 is a section on line A-B through the seal element shown in FIG. 3;

FIG. 6 is a plan of an alternative seal element with reinforcing elements tapered in cross-section; and FIG. 7 is a the section on line C-D through the seal element shown in FIG. 6.

DESCRIPTION OF PREFERRED EMBODIMENTS

Figure 1:
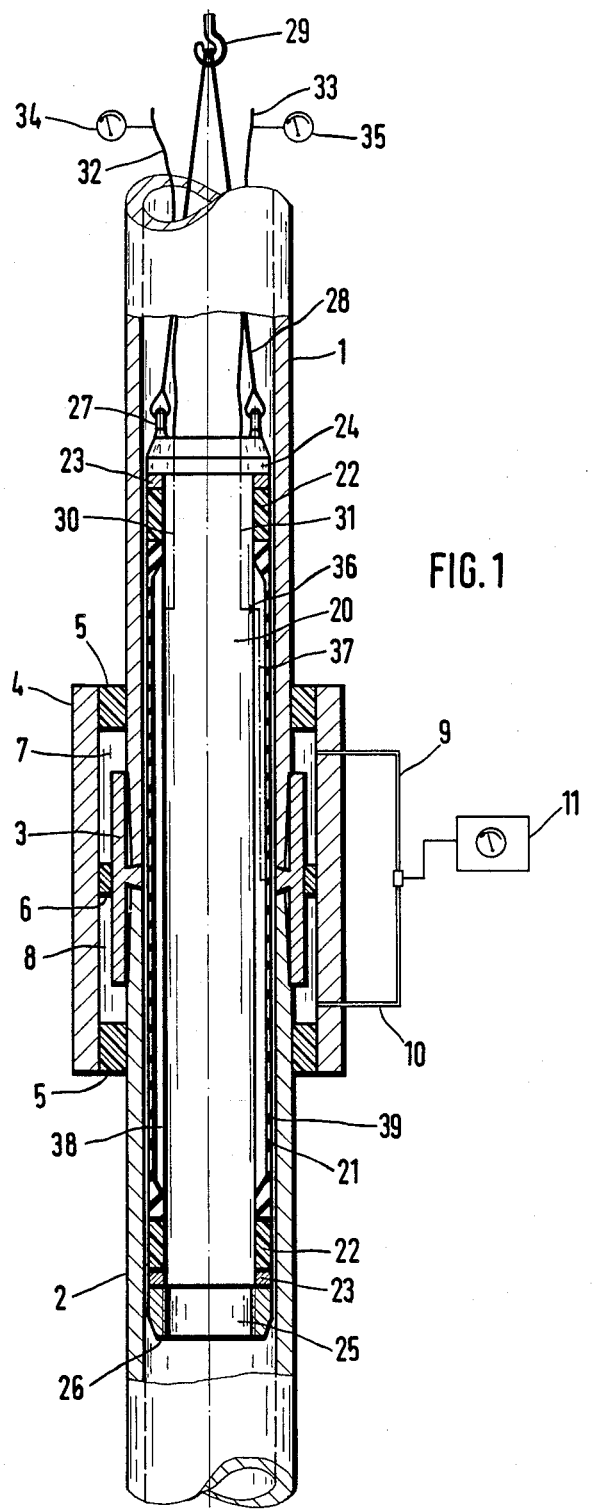
FIG. 1 shows, in longitudinal section, one embodiment of a test apparatus in accordance with the invention at the joint position of two pipes.
Figure 1A:
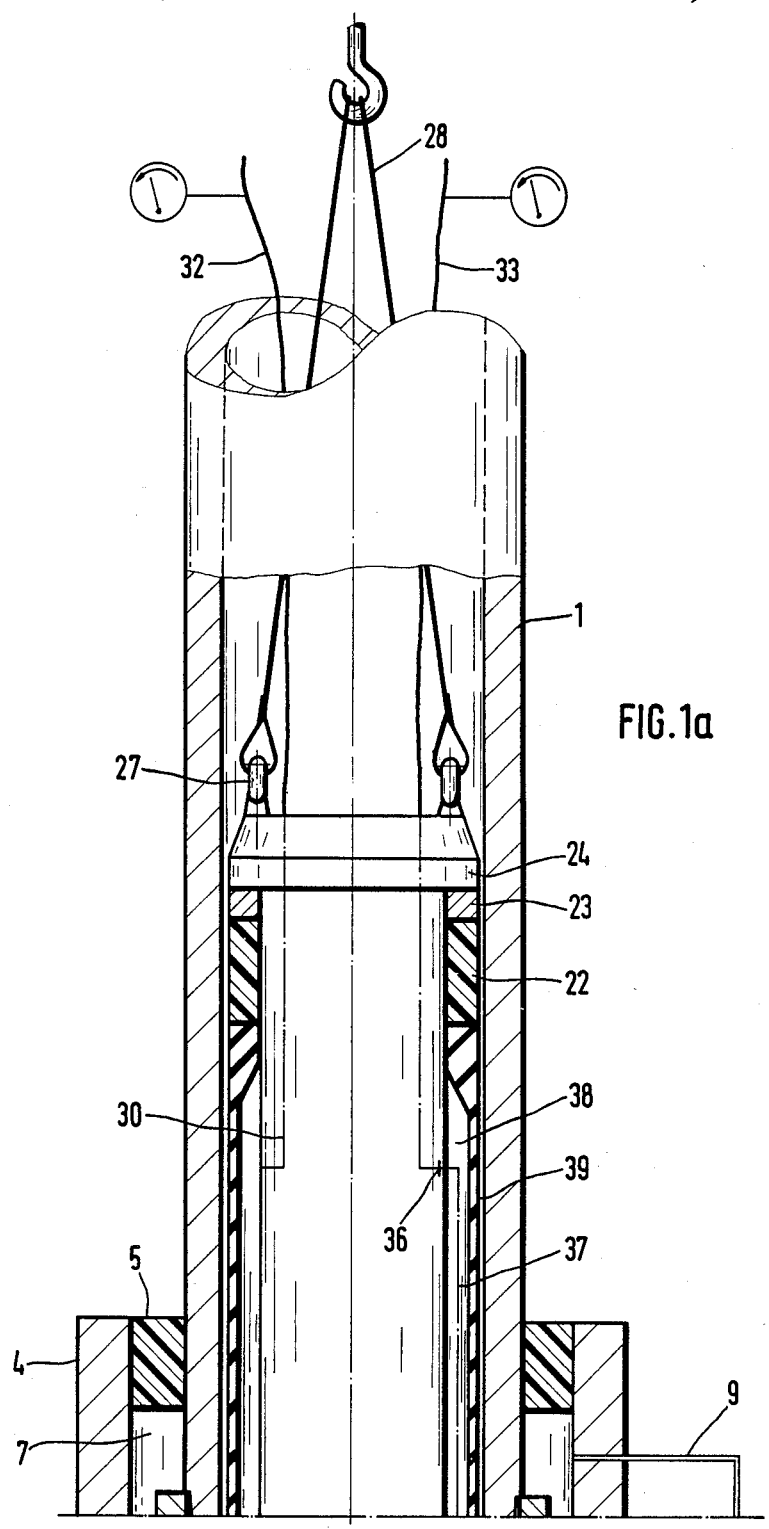
FIG. 1a and 1b together show a larger scale view of the apparatus shown in FIG. 1.
Figure 1B:
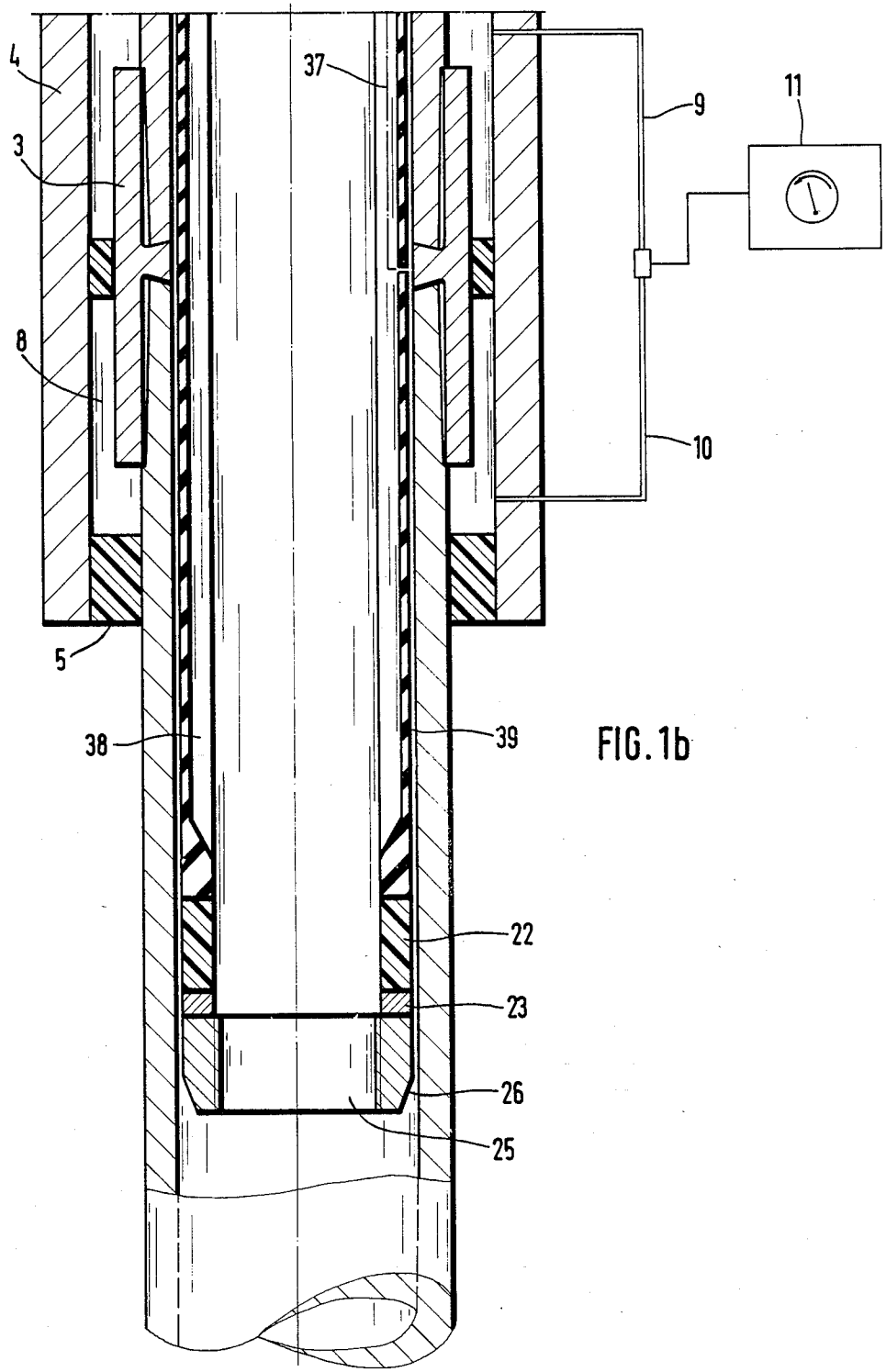

In the embodiment illustrated in FIGS. 1, 1a and 1b the ends of two pipes 1 and 2 are screwed into a common pipe socket 3.

In order to test whether it is possible for small quantities of gas to leak outwards through the mutually engaged screwthreads of the socket 3 and the ends of the pipes 1 and 2, the joint is enclosed by a test housing 4, which is sealed from the exterior at both ends by means of corresponding seal elements 5.

The interior of the test housing 4 is subdivided by a fluid-tight divider 6 into two test chambers 7 and 8. In use, gas leaking through the screwjoint can optionally be fed through pipes 9 and 10 to a measuring instrument 11.

A test apparatus constructed according to the invention is arranged within the pipes 1 and 2. It comprises a support shaft 20 for a membrane 21 made of an elastomeric material. The membrane is bounded on both sides by resilient seal elements 22, the diameters of which are enlargeable by axial forces. The resilient seal elements 22 abut bracing rings 23, made, for example of metal. The upper end of the support shaft 20 is provided with a collar 24, and the lower end with a screwthreaded pin 25 which receives a tensioning nut 26. The collar 24 is provided with two lifting eyes 27 for support ropes 28, by means of which the apparatus is suspended from the support hook 29 of a hoisting appliance, (not shown).

The support shaft 20 is provided with channels 30 and 31, into which supply pipes 32 and 33 for an incompressible pressurized medium and a gaseous test medium respectively lead. The pressures of the respective media can be monitored by measuring instruments 34 and 35.

The channel 31 for the gaseous test medium is provided with a connection 36 to a pipe 37 which extends through the pressure chamber 38 of the incompressible pressurized medium approximately to the longitudinal centre of the membrane 21 and is passed through the membrane in this region, so that the gaseous test medium can be passed to the exterior of the membrane 21 in the immediate region of the joint and fills the extremely small pressure chamber 39 between the exterior of the membrane 21 and the interior walls of the pipes 1 and 2.

In use, the test apparatus is first lowered into position shown in FIGS. 1, 1a and 1b. An incompressible pressurized medium, for example, water or hydraulic fluid is passed through the supply pipe 32 and the channel 30 into the pressure chamber 38, i.e., the annular space between membrane 21 and support shaft 20. The membrane 21 therefore exerts axial forces upon the resilient seal elements 22.

Because axial movement of the seal elements 22 is prevented by the collar 24 and the tensioning nut 26, the seal elements react with an enlargement of diameter against the interior of the pipes 1 and 2, thereby forming a test space which is subdivided by the membrane 21 extending in the axial direction of the pipes 1 and 2, into two concentric chambers 38, 39, which consist of the pressure chamber 38 and the pressure chamber 39. After the required liquid pressure is attained, gaseous test medium is passed via the supply pipe 3S. the channel 31 and the pipe 37 into the pressure chamber 39. The gas pressure must be at least slightly higher than the pressure of the incompressible pressurized medium in order to ensure that a sufficient quantity of gas becomes distributed in the annular space round the membrane 21. In the case of insufficient tightness of the joint, traces of gas will enter the chambers 7 and 8 of the test housing 4 and will be detected by the measuring instrument 11.

The test apparatus described is not only excellently suited for checking screwed joints, but also in the same manner for welded joints.

Figure 2:
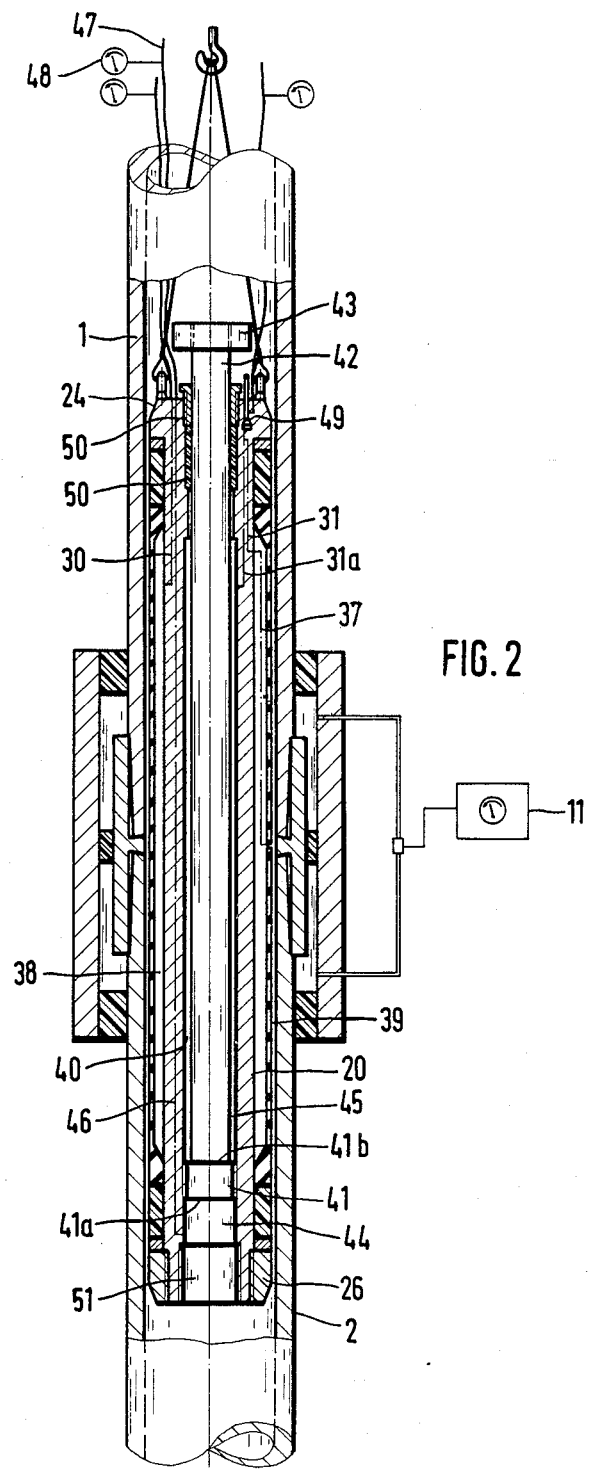
FIG. 2 shows, in longitudinal section, a second embodiment of a test apparatus in accordance with the invention of the joint position of two pipes.
Figure 2B:
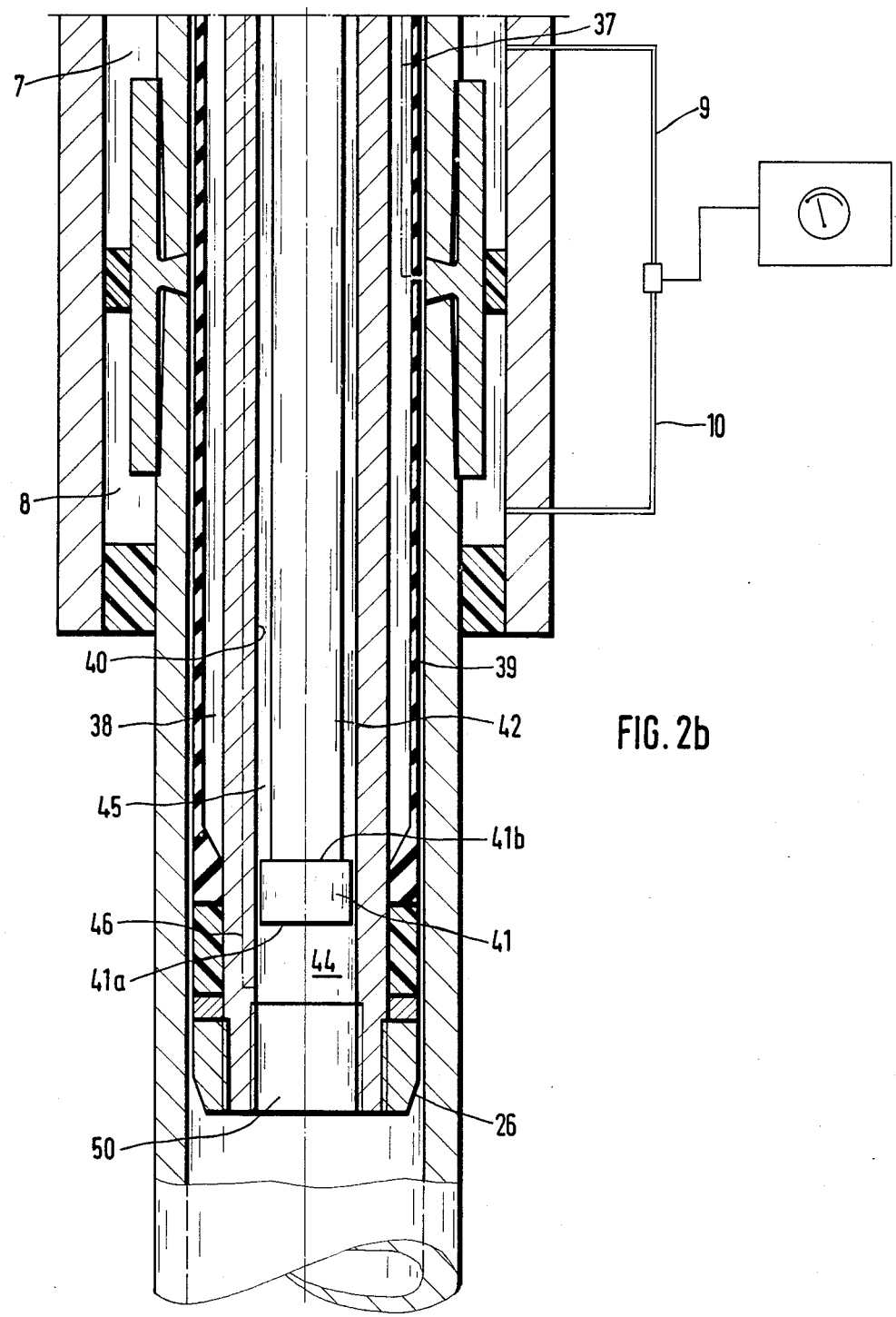

Referring now to FIG. 2 the support shaft 20 is provided with a central shouldered bore 40, in which a piston 41 with differential pressure surfaces 41a and 41b is longitudinally slidable. The piston 41 is supported by a piston rod 42 which protrudes out of the top of the support shaft 20 and is provided with a collar 43 at that end. The central shouldered bore 40 is subdivided by the piston 41 into a work pressure space 44 for an incompressible pressurized medium and into a gas pressure space 45 which surrounds the piston rod 42.

A supply channel 46 leads into the work pressure space 44 for an incompressible pressurized medium which is supplied to the channel 46 from the exterior through a separate pipe 47. The pressure in the work pressure space 44 can be monitored by a pressure gauge 48. The gas pressure space 45 received gaseous test medium through a branch channel 31a of the channel S1. A non-return valve 49, which is inserted into the channel 31, prevents any return flow of the test medium in the case of a pressure rise. The upper end of the piston rod 42 is sealed by a customary stuffing box 50, so that no gas can pass from the gas pressure space 45 to the exterior.

Due to the introduction of the gaseous test medium into the pressure chamber 39 between the exterior surface of the membrane 21 and the interior walls of the pipes 1 and 2 in the region of the test station, the gas pressure space 45, i.e., the annular space between the piston rod 42 and the central shouldered bore 40, simultaneously become filled with gaseous test medium through the pipe 31a. As soon as incompressible pressurized medium has passed through the pipe 47 and the supply channel 46 into the work pressure space 44 and has exceeded a predetermined value, the piston 41 slides upwardly. This causes the pressure of the gaseous test medium in the gas pressure space 45 to rise. Because the surface 41a of the piston 41 facing the work pressure space 44 is greater than the piston surface 41b, the gaseous test medium attains a higher pressure than the incompressible pressurized medium in the work pressure space 44. It is thereby possible to increase quite considerably the operational safety and similarly the test medium pressure. The work pressure space 44 is sealed hermetically from the exterior by a screwthreaded plug 51.

In order to remove the apparatus on completion of tests, the pressure in the work pressure space 44 is first of all reduced via the supply channel 46 and the pipe 47. The pressure in the gas pressure chamber 45 thereupon pushes the piston rod 42 towards the screwthreaded plug 51 until the collar 43 at the free end of the piston rod 42 opens the non-return valve 49 and thus automatically ensures relief of the gas pressure. The apparatus can then be withdrawn out of the pipe 1.

Figure 5:
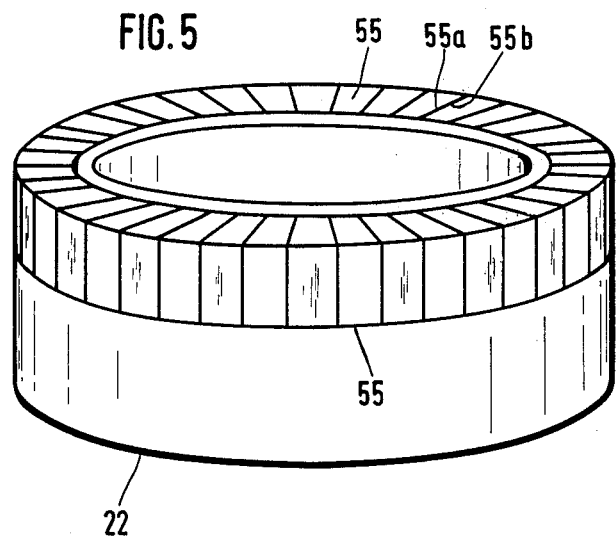
FIG. 5 is a perspective view of the seal element shown in FIGS. 3 and 4.

As shown in FIGS. 3, 4 and 5 the resilient seal elements 22 are provided with lamellar reinforcing elements 55 at their ends facing the collar 24 and the tensioning screw 26 respectively. They are vulcanized into the material of the seal elements and placed with their radially oriented dividing surfaces 55a, 55b in direct mutual contact in the initial state of the seal elements. In the case of an enlargement of diameter, such as is illustrated by the dash lines 22a (FIG. 3), the reinforcing elements travel radially outwards and thereby come into abutment against the interior wall of the pipes 1 and 2. They simultaneously inhibit material of the seal elements becoming squeezed between the collar 24 or the tensioning screw 26 and the bracing rings 23 placed in front which leads to a gradual destruction of the seal elements during repeated use of the test apparatus.

FIGS. 6 and 7 show another embodiment of a seal element in which the reinforcing elements 60 are of frustoconical cross-section. The elements 60 are vulcanized into the material so that definite gaps 61 are present between them in the initial state, which close in the case of an enlargement of diameter of the seal element and thereby ensure a radial movement in order to form a reinforcing ring. With this embodiment particularly, in spite of the considerable axial pressure which acts upon the seal elements, the elastomeric material is not squeezed between the dividing surfaces of the reinforcing elements 60 in the axial direction. The reinforcing elements 55, 60 have irregular edges 57 and 63 respectively at their ends which extend into the material of the seal elements in order to achieve excellent connection to the elastomeric material os the steal elements 22.

I claim:

1. An apparatus for testing the gas-tightness of joints between hollow bodies, which apparatus comprises:
   a support shaft;
   a first resilient seal element mounted on said support shaft;
   a second resilient seal element mounted on said support shaft and spaced from said first resilient seal element with a space between them;
   a membrane extending between said first resilient seal element and said second resilient seal and second resilient seal elements into two concentric pressure chambers;
   means for transmitting a liquid to one side of said membrane;
   means to supply a gas to the other side of said membrane; and a pressure amplifier, said pressure amplifier comprising
 a bore extending along said shaft,
 a piston slidable in said bore, said piston having differential pressure surfaces on opposite faces thereof,
 a channel for conveying liquid to the surface of the piston having the greater pressure area, and
 a channel interconnecting the surface of the piston having the smaller pressure area with the other side of said membrane.

2. An apparatus as claimed in claim 1, wherein at least one of said first and second resilient seal elements is generally annular and at least one face thereof is provided with a plurality of lamellar reinforcing elements.

3. An apparatus as claimed in claim 1, wherein at least one of said first and second resilient seal elements is generally annular and has at least one face thereof provided with a plurality of lamellar reinforcing elements which are in mutual contact when said apparatus is not in use.

4. An apparatus as claimed in claim 2, wherein the lamellar reinforcing elements are of substantially frusto-conical cross-section and are spaced from one another when the apparatus is not in use but which closes when the apparatus is under pressure.

5. An apparatus as claimed in claim 4, wherein the lamellar reinforcing elements comprise steel.

6. An apparatus as claimed in claim 5, wherein the at least one of said first and second resilient seal elements is made from an elastomeric material and wherein the lamellar reinforcing elements are vulcanized into the elastomeric material of the seal element.

* * * * *